United States Patent
Chang et al.

(10) Patent No.: US 8,040,621 B2
(45) Date of Patent: Oct. 18, 2011

(54) MINIATURE MAGNETIC-LEVITATED LENS DRIVING DEVICE

(75) Inventors: Chi Lone Chang, Hsinchu County (TW); Chuan Yu Hsu, Hsinchu County (TW); Wen Tsai Hsu, Hsinchu County (TW); Chi Tai Meng, Hsinchu County (TW)

(73) Assignee: PowerGate Optical Inc. (TW)

( * ) Notice: Subject to any disclaimer, the term of this patent is extended or adjusted under 35 U.S.C. 154(b) by 0 days.

(21) Appl. No.: 12/657,506

(22) Filed: Jan. 22, 2010

(65) Prior Publication Data

US 2010/0195223 A1 Aug. 5, 2010

(30) Foreign Application Priority Data

Feb. 3, 2009 (CN) ...................... 2009 2 0001288 U (51) Int. Cl.
G02B 7/02 (2006.01)
G03B 3/10 (2006.01)

(52) U.S. Cl. ........ 359/824; 359/814; 359/823; 396/133; 396/439; 720/683; 310/12.24; 369/44.15

(58) Field of Classification Search .................. 359/814, 359/823, 824, 696; 310/12.02, 12.08, 12.16, 310/12.24, 12.31, 14, 15, 273; 396/133, 396/439; 369/44.14–44.16; 720/681–683
See application file for complete search history.

(56) References Cited

U.S. PATENT DOCUMENTS

| 4,643,522 | A  | * | 2/1987  | Takashima .................... 359/824 |
| 5,739,608 | A  | * | 4/1998  | Kim .............................. 310/90.5 |
| 7,391,579 | B2 | * | 6/2008  | Ho et al. ....................... 359/696 |
| 7,394,603 | B2 | * | 7/2008  | Shiraki et al. ................. 359/819 |
| 7,634,189 | B2 | * | 12/2009 | Hong et al. ................... 396/133 |
| 7,663,818 | B2 | * | 2/2010  | Chung .......................... 359/814 |
| 7,663,823 | B2 | * | 2/2010  | Chung .......................... 359/824 |
| 7,706,088 | B2 | * | 4/2010  | Chung .......................... 359/823 |
| 7,719,779 | B2 | * | 5/2010  | Yamashita .................... 359/824 |
| 7,787,046 | B2 | * | 8/2010  | Nagasaki ...................... 348/374 |

* cited by examiner

*Primary Examiner* — Loha Ben (57) ABSTRACT

A miniature magnetic-levitated lens driving device includes a lid, a casing, a lens module, a plate spring, and a magnetic-levitated module. The lid has a hollow structure and is coupled to the casing. The casing is formed therein with a receiving space. The lens module is provided in the receiving space. The plate spring is fixed between the lid and the casing and configured to resiliently confine the lens module to the receiving space. The magnetic-levitated module is provided in the receiving space and corresponds in position to the lens module. A magnetic repulsive force is produced by and between the magnetic-levitated module and the lens module, and in consequence the lens module is magnetically suspended in the receiving space formed by the lid and the casing, so as to save power, and minimize friction and microparticles.

12 Claims, 8 Drawing Sheets

MINIATURE MAGNETIC-LEVITATED LENS DRIVING DEVICE

BACKGROUND OF INVENTION

1. Field of the Invention

The present invention relates to lens driving devices, and more particularly, to a miniature magnetic-levitated lens driving device wherein an optical lens module is magnetically suspended in a casing by a magnetic-levitated module and powered by an electromagnetic field.

2. Description of the Prior Art

Figure 1:
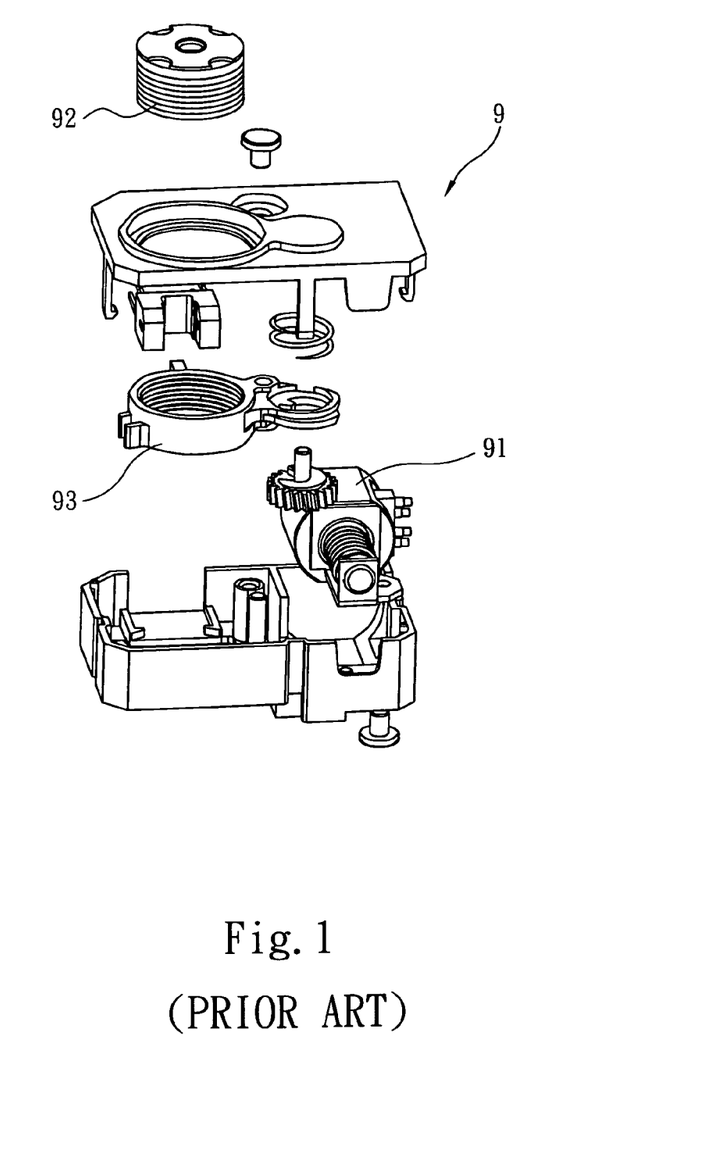
FIG. 1 is an exploded perspective view of a conventional focusing lens.

Referring to FIG. 1, there is shown an exploded perspective view of a conventional focusing lens. As shown in the drawing, a mechanical-transmission focusing mechanism 9 for use with the conventional focusing lens comprises a high-cost high-precision driving component 91 (such as a stepping motor, ultrasonic motor, or piezoelectric actuator), a carrier 93 provided with a lens module 92 and driven by the driving component 91, and lots of transmission components. Hence, the conventional focusing lens is complicated in terms of its mechanical framework, difficult and intricate to assemble, bulky, expensive, power-consuming, and thus price-uncompetitive.

Primitive photography was complicated, as it required taking laborious steps, such as manual light metering, manual focusing, and automatic winding, and the laborious steps predisposed users to mistakes. Primitive photography was especially demanding when performed at important scenes which offer a once-in-a-lifetime opportunity of taking important pictures. Hence, photographers played a crucial role in successful application of primitive photography. The 1950s and 1960s saw remarkable advancement of mechanical automation, and thus human beings are increasingly assured that automation is going to be the yardstick of a promising world. Automatic light metering techniques and electric winders developed earlier are sufficient proofs that photography is likely to undergo automation. The most important factor in automation of primitive photography is the photographic speed-determining step essential to an automatic focusing system, which was therefore regarded as a hot R&D topic by camera manufacturers at that time.

With ever-improving photographic technology, approaches to improving display quality and implement miniaturization of photographic devices are often proposed in hopes of meeting the demand for diversified products in the information era. However, a zooming lens mechanically driven by a stepping motor has a drawback, that is, no chance of further miniaturizing the zooming lens, which is a factor in failure to miniaturize products.

Manufacturers apply electromagnetic technology and use a VCM (Voice. Coil Motor) electronic feedback system to monitor a coil offset so as to dispense with conventional stepping motors, thereby further downsizing a driving structure. Also, manufacturers implement integration of products of different functions by, for example, integrating a photographic function into a cell phone configured for mobile communication, integrating a photographic function into a personal digital assistant (PDA), or integrating a photographic function into a notebook computer, so as to enhance video-related functions of cell phones, PDAs, or notebook computers.

Accordingly, related R&D carried out by manufacturers involves reducing the size, cutting the costs, and reducing power consumption of products that share a power supply device, so as to efficiently increase standby duration and usage duration of the products that share the power supply device while the capacity of the power supply device remains unchanged.

SUMMARY OF INVENTION

It is an objective of the present invention to provide a miniature magnetic-levitated lens driving device for magnetically suspending a lens module in a receiving space of a casing by magnetic suspension, so as to provide resistance to vibration, minimize friction, prevent dust contamination, and enable power saving by reducing the power consumed for driving the lens module.

In order to achieve aforementioned objective, the present invention discloses a miniature magnetic-levitated lens driving device which includes a lid, a casing, a lens module, a plate spring, and a magnetic-levitated module. The lid has a hollow structure and is coupled to the casing. The casing is formed therein with a receiving space. The lens module is provided in the receiving space. The plate spring is fixed between the lid and the casing and configured to resiliently confine the lens module to the receiving space. The magnetic-levitated module is provided in the receiving space and corresponds in position to the lens module. A magnetic repulsive force is produced by and between the magnetic-levitated module and the lens module, and in consequence the lens module is magnetically suspended in the receiving space formed by the lid and the casing, so as to save power, and minimize friction and microparticles.

In a preferred embodiment, the lens module further comprises a lens and a lens carrier, the lens being centrally disposed in the lens carrier and movable together with the lens carrier synchronously.

In a preferred embodiment, the first magnet comprises a plurality of ring-shaped movable magnets coupled to the lens module, and the second magnets are permanent magnets peripherally provided on an inner wall of the casing and corresponding in position to the movable magnet while the coil is a circular coil fixed to the inner wall of the casing and disposed in a gap between the movable magnet and permanent magnets.

In a preferred embodiment, the permanent magnets and the movable magnet have two facing surfaces of a same polarity (pole N or pole S), and an axial center of the permanent magnets is lower than an axial center of the movable magnet by a preset distance in a backward direction.

In a preferred embodiment, the permanent magnets are arranged into a quadruplet, equidistantly spaced apart, provided on a periphery of the receiving space and the inner wall of the casing, and configured to work in conjunction with the movable magnet corresponding in position to the permanent magnets to produce repulsion therebetween.

In a preferred embodiment, the miniature magnetic-levitated lens driving device further comprises a lid and a plate spring fixed between the lid and the casing and configured to resiliently confine the lens module to the receiving space.

In a preferred embodiment, a gap between two adjacent said first magnets has a preset length and is substantively aimed at a center of a corresponding said second magnet provided in the receiving space.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION

Figure 2:
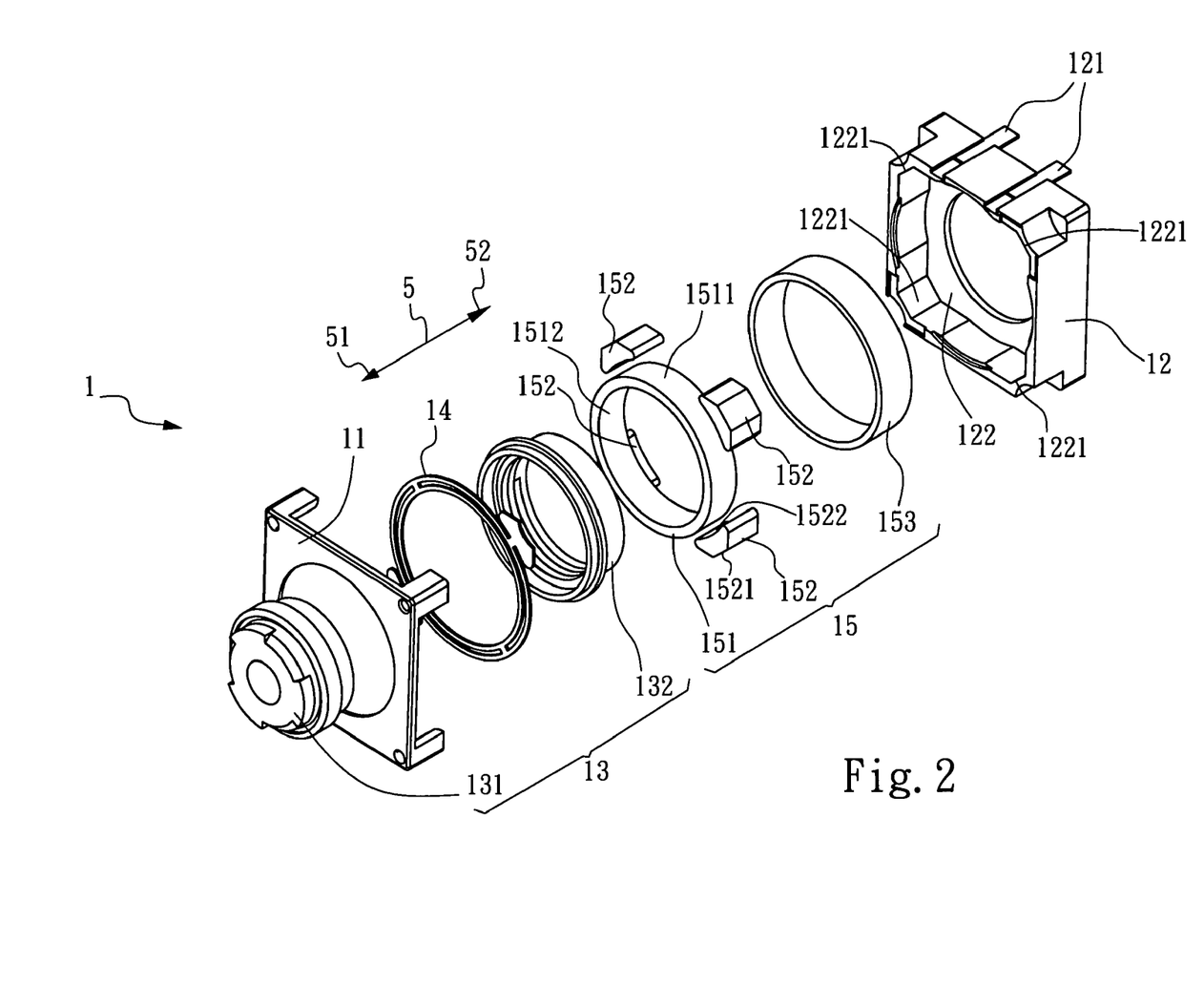
FIG. 2 is an exploded perspective view of a miniature magnetic-levitated lens driving device according to the present invention.
Figure 3:
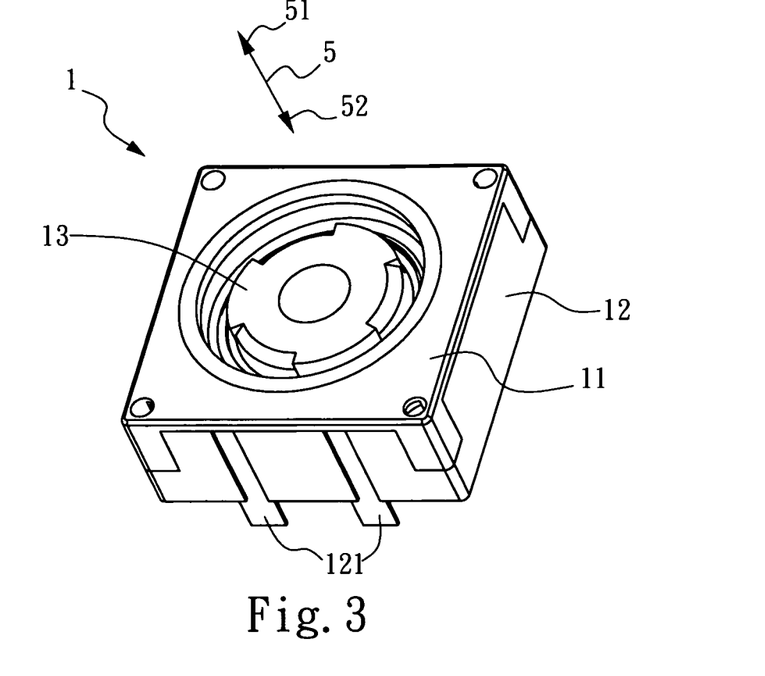
FIG. 3 is a perspective assembled view of the miniature magnetic-levitated lens driving device according to the present invention.

Referring to FIG. 2 and FIG. 3, there are shown an exploded perspective view and a perspective assembled view of a miniature magnetic-levitated lens driving device according to the present invention. As shown in the drawings, a miniature magnetic-levitated lens driving device 1 is defined with a central axis 5 and comprises a lid 11, a casing 12, a lens module 13, a plate spring 14, and a magnetic-levitated module 15. The central axis 5 is characterized by a forward direction 51 and a backward direction 52.

The lid 11 is of a hollow and annular structure. The casing 12 is of a hollow structure. At least a power source connecting line 121 is provided at a peripheral predetermined position of the casing 12. The lid 11 and the casing 12 are coupled to each other to thereby substantively form a receiving space 122 such that the receiving space 122 functions as a hollow core of the lid 11 and the casing 12 coupled together. A plurality of receiving recesses 1221 equidistantly spaced apart are provided on the periphery of the receiving space 122 and the inner wall of the casing 12.

The lens module 13 is provided in the receiving space 122, centrally aligned with the central axis 5, magnetically suspended in the receiving space 122 formed by the lid 11 and the casing 12, and movable to and fro along the central axis 5 inside the casing 12. The lens module 13 comprises a lens 131 and a lens carrier 132. The lens 131 is centrally disposed in the lens carrier 132 and movable together with the lens carrier 132 synchronously. The plate spring 14 is fixed between the lid 11 and the casing 12 and configured to resiliently confine the lens carrier 132 of the lens module 13 to the receiving space 122.

The magnetic-levitated module 15 is disposed in the receiving space 122 and corresponds in position to the lens module 13. The magnetic-levitated module 15 comprises at least a ring-shaped movable magnet 151 (hereinafter alternatively referred to as the "first magnet"), a plurality of permanent magnets 152 (hereinafter alternatively referred to as the "second magnets"), and a circular coil 153. The movable magnet 151 can be formed from a plurality of magnets, coupled to the lens module 13, and provided outside the lens carrier 132 peripherally.

The permanent magnets 152 are disposed in the receiving space 122 and correspond in position to the movable magnet 151. The lens module 13 is magnetically suspended in the receiving space 122 formed by the lid 11 and the casing 12 and centrally aligned with the central axis 5 by means of a magnetic repulsive force produced by and between the movable magnet 151 (enclosing the lens module 13) and the permanent magnets 152 of the magnetic-levitated module 15.

In a preferred embodiment of the present invention, the permanent magnets 152, which are arranged into a quadruplet and equidistantly spaced apart, are provided on the periphery of the receiving space 122 and the inner wall of the casing 12. The permanent magnets 152 are confined to the receiving recesses 1221, respectively, and work in conjunction with the movable magnet 151 corresponding in position thereto to produce repulsion therebetween. The circular coil 153 is disposed in a gap between the movable magnet 151 and the permanent magnets 152 and fixed to the periphery of the receiving space 122 and the inner wall of the casing 12. The circular coil 153 is connectable to the power source connecting line 121 provided at the peripheral predetermined position of the casing 12, and predetermined electric currents transmitted in different directions are applied. Owing to changes in an electromagnetic field, the lens carrier 132 undergoes axial displacement in the forward direction 51 or the backward direction 52 of the central axis 5 within the receiving space 122 to thereby enable the focusing or zooming of the lens 131.

Figure 4:
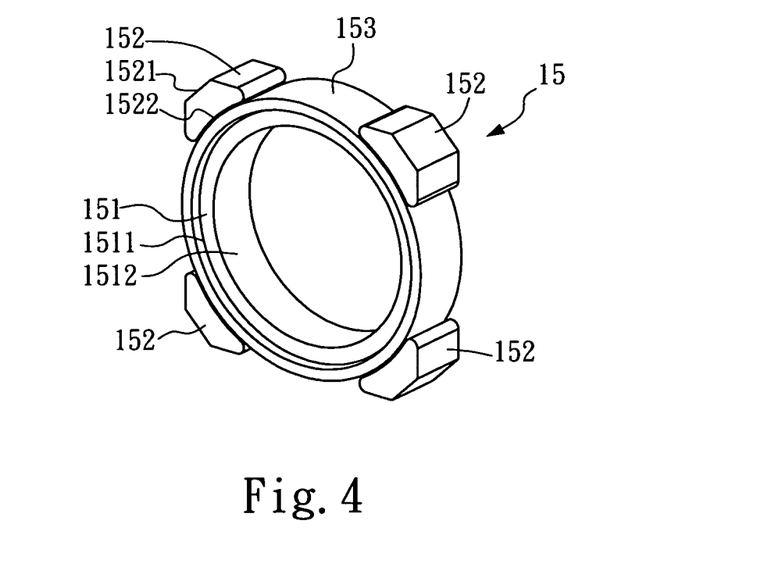
FIG. 4 is a perspective view of a magnetic-levitated module of the miniature magnetic-levitated lens driving device according to the present invention.

Referring to FIG. 4 showing a perspective view of a magnetic-levitated module of the miniature magnetic-levitated lens driving device according to the present invention in conjunction with FIG. 2, each of the permanent magnets 152 has an upper surface 1521 and a lower surface 1522, and the upper surface 1521 and the lower surface 1522 are of opposite polarity provided as needed (such as pole N versus pole S, or pole S versus pole N). Owing to the polarity (pole N or pole S) of the upper surfaces 1521, the permanent magnets 152 are equidistantly spaced apart and fixed in position to the receiving recesses 1221 of the casing 12, respectively. The lower surfaces 1522 have the same polarity (pole N or pole S) and are arranged inside the receiving space 122.

Figure 5:
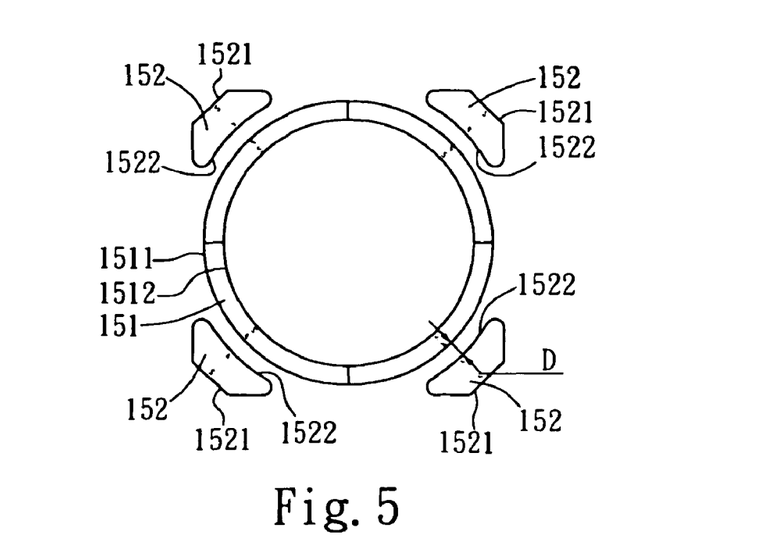
FIG. 5 is a top view of the magnetic-levitated module of the miniature magnetic-levitated lens driving device in a first preferred embodiment according to the present invention.

Referring to FIG. 5, there is shown a top view of the magnetic-levitated module of the miniature magnetic-levitated lens driving device in a first preferred embodiment according to the present invention. As shown in the drawing, the lower surfaces 1522 of the permanent magnets 152 are separated from the movable magnet 151 by a preset gap D therebetween, and the preset polarity (pole N or pole S) of the lower surfaces 1522 is the same as the polarity (pole N or pole S) of an outer rim 1511 of the movable magnet 151; in other words, the permanent magnets 152 and the movable magnet 151 have two facing surfaces, respectively, and the two facing surfaces are of the same polarity (pole N or pole S) to thereby produce repulsion between the permanent magnets 152 and the movable magnet 151. The lens carrier 132 fixed to an inner rim 1512 of the movable magnet 151 is magnetically suspended in the receiving space 122 of the casing 12.

Figure 6:
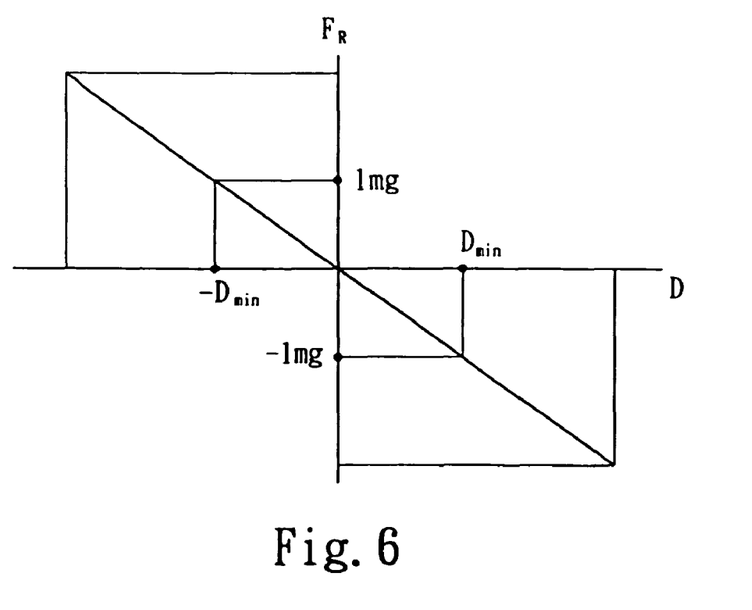
FIG. 6 is a graph of restoring force against a gap between a movable magnet and permanent magnets of the miniature magnetic-levitated lens driving device according to the present invention.

Referring to FIG. 6 showing a graph of restoring force against a gap between a movable magnet and permanent magnets of the miniature magnetic-levitated lens driving device according to the present invention with conjunction of FIG. 5, the displacement of the movable magnet 151 produces a restoring force FR (a restoring force to center) >1 mg (m denotes the mass of the lens module 13, and g denotes acceleration due to gravity); meanwhile, the preset gap D between the permanent magnets 152 and the movable magnet 151 must be greater than $D_{min}$ (minimum required gap) so as for the lens module 13 to move in the forward direction 51 or the backward direction 52 (see FIG. 2) of the central axis 5 inside the receiving space 122 of the casing 12 without causing friction.

Figure 7:
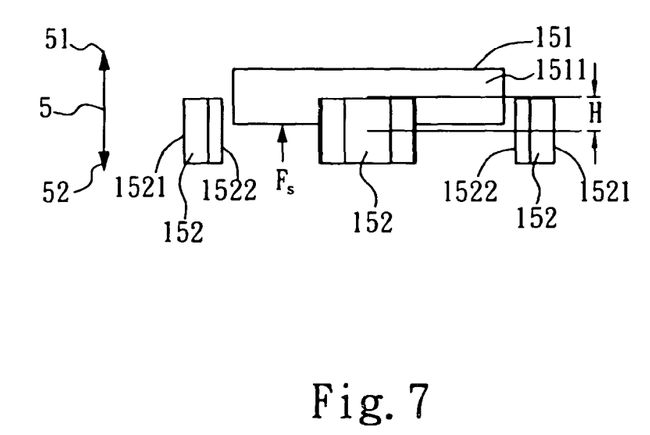
FIG. 7 is a side view of the magnetic-levitated module of the miniature magnetic-levitated lens driving device according to the present invention.

Referring to FIG. 7, there is shown a side view of the magnetic-levitated module of the miniature magnetic-levitated lens driving device according to the present invention. As shown in the drawing, in addition to the same polarity of the lower surface 1522 of the permanent magnets 152 and the outer rim 1511 of the movable magnet 151 corresponding in position thereto, an axial potential difference H brought about between the permanent magnets 152 and the movable magnet 151 due to a focusing movement (the axial center of the permanent magnets 152 is lower than the axial center of the movable magnet 151 by the axial potential difference H in the backward direction 52) causes the permanent magnets 152 to exert a magnetic repulsive force Fs (a repulsive force due to stored energy) on the movable magnet 151 in the forward direction 51 of the central axis 5.

Figure 8:
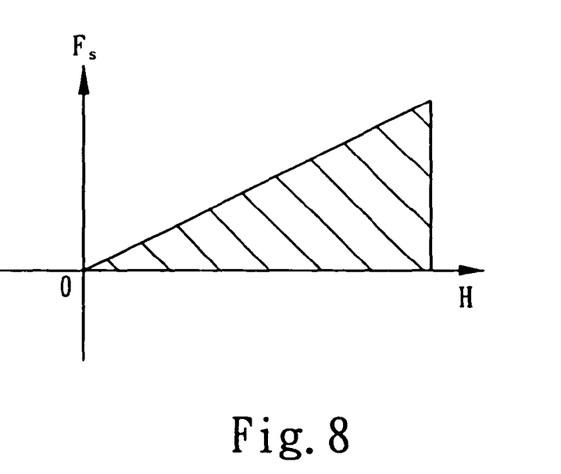
FIG. 8 is a graph of repulsive force against displacement between the movable magnet and the permanent magnets of the miniature magnetic-levitated lens driving device according to the present invention.

Referring to FIG. 8 showing a graph of repulsive force against displacement between the movable magnet and the permanent magnets of the miniature magnetic-levitated lens driving device according to the present invention with conjunction of FIG. 7, the stored energy that exists between permanent magnets 152 and the movable magnet 151 provides the repulsive force Fs for moving the lens module 13 in the forward direction 51 of the central axis 5. Hence, the repulsive force Fs is linearly correlated to the axial potential difference H and thus increases with the axial potential difference H; in other words, the magnitude of the repulsive force Fs increases in the forward direction 51 of the central axis 5 proportionately. Therefore, with the repulsive force Fs, the circular coil 153 is effective in driving the lens module 13 in a power-saving manner.

Figure 9:
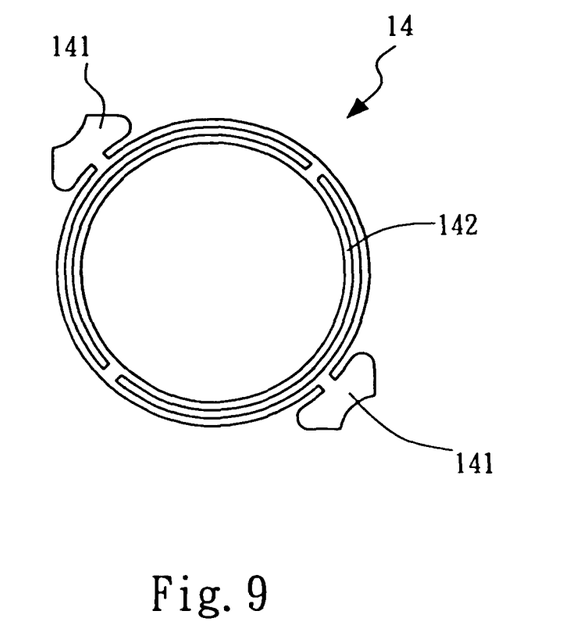
FIG. 9 is a top view of a plate spring of the miniature magnetic-levitated lens driving device according to the present invention.

Referring to FIG. 9 showing a top view of a plate spring of the miniature magnetic-levitated lens driving device according to the present invention with conjunction of FIG. 2, to enhance lens stability, the miniature magnetic-levitated lens driving device 1 of the present invention further comprises the plate spring 14 capable of buffering and configured to suspend and support the lens module 13 in the receiving space 122. In a preferred embodiment, the plate spring 14 is a ring-shaped resilient plate with a rim having a plurality of fixing ends 141 protruding therefrom. The plate spring 14 is fixed to between the lid 11 and the casing 12 and configured to exert a preset spring force Fe on the lens module 13. Under electromagnetic force, the lens carrier 132 moves in the forward direction 51 of the central axis 5 to thereby allow an inner ring 142 of the plate spring 14 to resiliently press against the front of the lens carrier 132; hence, not only is the lens module 13 stabilized, but the lens module 13 is resiliently confined to the receiving space 122 and thus prevented from being driven out of the receiving space 122 due to a repulsive force from the magnets 151, 152.

Figure 10:
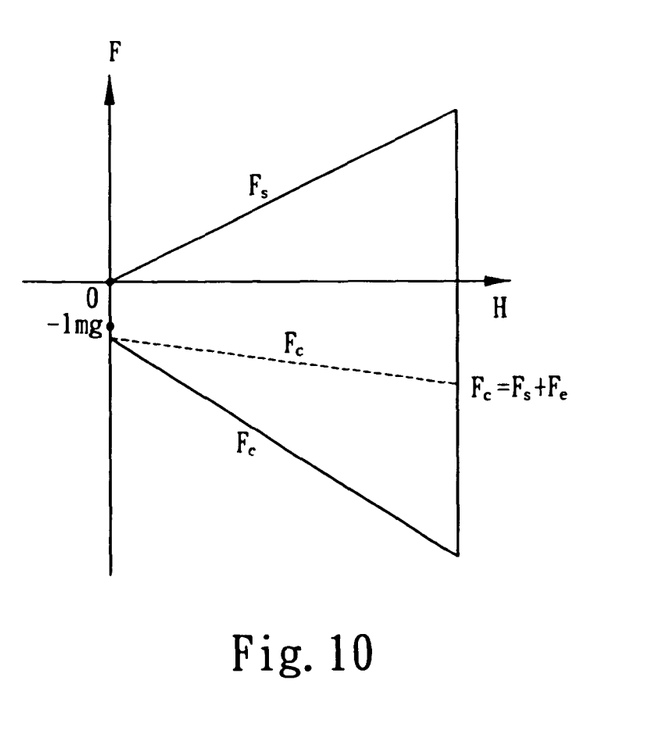
FIG. 10 is a graph of repulsive force against spring force of the movable magnet and the permanent magnets of the miniature magnetic-levitated lens driving device according to the present invention.

Referring to FIG. 10, there is shown a graph of repulsive force against spring force of the movable magnet and the permanent magnets of the miniature magnetic-levitated lens driving device according to the present invention. As shown in the drawing, where the axial potential difference H=0, the spring force Fe of the plate spring 14 is less than −1 mg (m denotes the mass of the lens module 13, and g denotes acceleration due to gravity) and functions as a pre-load of the lens module 13. Electric current passes through the circular coil 153 to produce electromagnetic force Fc expressed by Kc*i (Kc denotes a constant, and i denotes coil current), and thus the lens module 13 moves in the forward direction 51 of the central axis 5 to further move the lens 131 to an appropriate position and finish the focusing or zooming operation. The magnetic force Fc required must be sufficient to overcome the resultant force of the repulsive force Fs and the spring force Fe. When the lens module 13 lies horizontally and faces laterally, |Fc|=|Fs+Fe|; when the lens module 13 is vertical and faces upward or downward, |Fc|=|Fs+Fe|±|mg|. A conventional lens driving mechanism is characterized by |Fc|=|Fe|. By contrast, the miniature magnetic-levitated lens driving device 1 of the present invention is undoubtedly characterized by |Fc|=|Fs+Fe|<|Fe|, and thus power consumption of the circular coil 153 of the present invention is greatly reduced to thereby effectuate power saving.

Constituent elements of the miniature magnetic-levitated lens driving device 1 in the other preferred embodiments described below are mostly identical or similar to that in the aforesaid preferred embodiments. Hence, the same elements and structures are not repeatedly described hereunder. Like elements are named and numbered alike hereunder. Likewise, similar elements are named alike but each denoted with the original reference numeral followed by the letter 'a' for distinction. Like elements and similar elements are not described hereunder.

Figure 11:
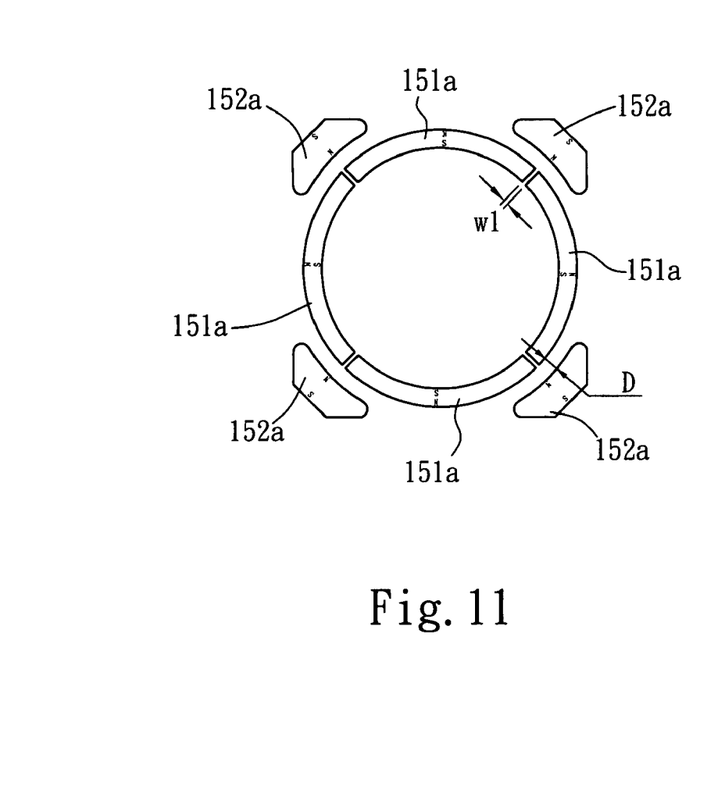
FIG. 11 is a schematic view of the movable magnet and the permanent magnets of the miniature magnetic-levitated lens driving device in a second preferred embodiment according to the present invention.

Referring to FIG. 11, there is shown a schematic view of the movable magnet and the permanent magnets of the miniature magnetic-levitated lens driving device in a second preferred embodiment according to the present invention. As shown in the drawing, regarding the miniature magnetic-levitated lens driving device 1, the second preferred embodiment differs from the first preferred embodiment in that, in the second preferred embodiment, the gap between two adjacent ones of a plurality of movable magnets 151a (or first magnets) arranged in a circle and encircling the lens carrier 132 has a preset distance w1, and is substantively aimed at the center of a corresponding one of permanent magnets 152a (or second magnets) provided in the receiving space 122 and separated from the center of the corresponding one of the permanent magnets 152a by a preset distance D. Owing to interaction between the strongest point and the weakest point of magnetic force arising from two magnetic fields produced by the movable magnets 151a and the permanent magnets 152a, respectively, the movable magnets 151a are fixed in position such that the lens module 13 firmly held by the movable magnets 151a does not rotate inside the receiving space 122 of the casing 12.

Figure 12:
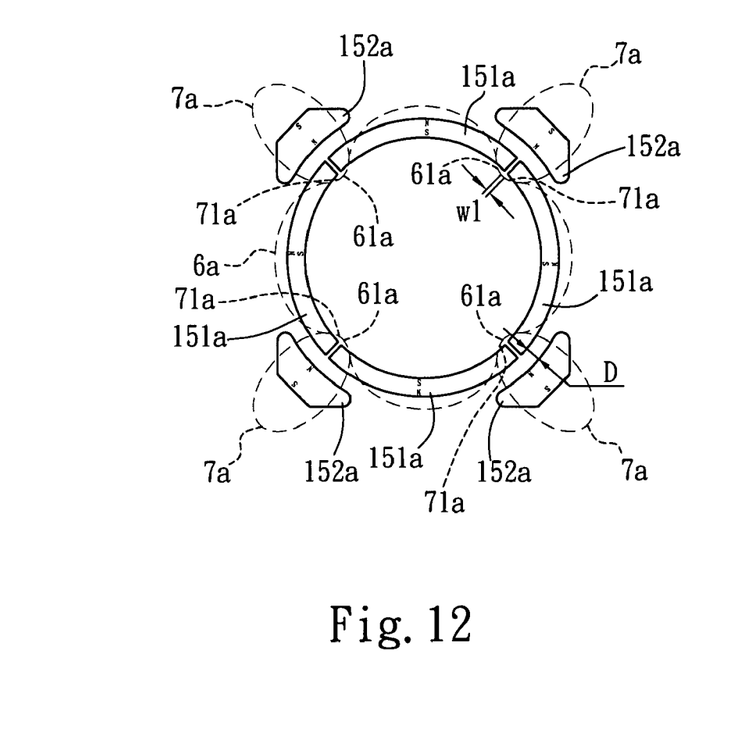
FIG. 12 is a schematic view of magnetic force of the miniature magnetic-levitated lens driving device in the second preferred embodiment according to the present invention.

Referring to FIG. 12, there is shown a schematic view of magnetic force of the miniature magnetic-levitated lens driving device in the second preferred embodiment according to the present invention. As shown in the drawing, each one of the movable magnets 151a and each one of the permanent magnets 152a have an electromagnetic field and thus produce a first magnetic force 6a and a second magnetic force 7a (by imagination), respectively, and the first and second magnetic forces 6a, 7a are the strongest at the centers of the movable magnet 151a and the permanent magnets 152a and decrease with distance away from the centers. Each of the second magnetic forces 7a is the strongest at a magnetic force peak 71a thereof. The preset distance w1 between two adjacent ones of the plurality of movable magnets 151a further weakens the magnetic force between two adjacent ones of the plurality of movable magnets 151a to thereby create a plurality of magnetic force pits 61a (the weakest points of magnetic force) of the first magnetic force 6a. The number of the magnetic force pits 61a equals the number of the movable magnet 151a. The magnetic force peaks 71a are engaged with the magnetic force pits 61a, respectively.

With the first and second magnetic forces 6a, 7a being of the same polarity (pole N or pole S), interaction between the magnetic force pits 61a (i.e., the weakest point of the first magnetic force 6a) and the magnetic force peak 71a (i.e., the strongest point of the second magnetic force 7a) is comparable, from an imaginary mechanical point of view, to the mating between a top land and a bottom land of two mating gear teeth, respectively. In the second preferred embodiment, four said permanent magnets 152a are provided, and thus engagement of the magnetic force peak 71a with the magnetic force pits 61a occurs to every angular displacement of 90 degrees; hence, interaction between the first magnetic force 6a and the second magnetic force 7a arising from the movable magnet 151a and the permanent magnets 152a allows the lens module 13 to be more firmly fixed to the receiving space 122 and prevents the lens module 13 from rotating due to vibration or any other factors in the course of operation, delivery, or storage.

Figure 13:
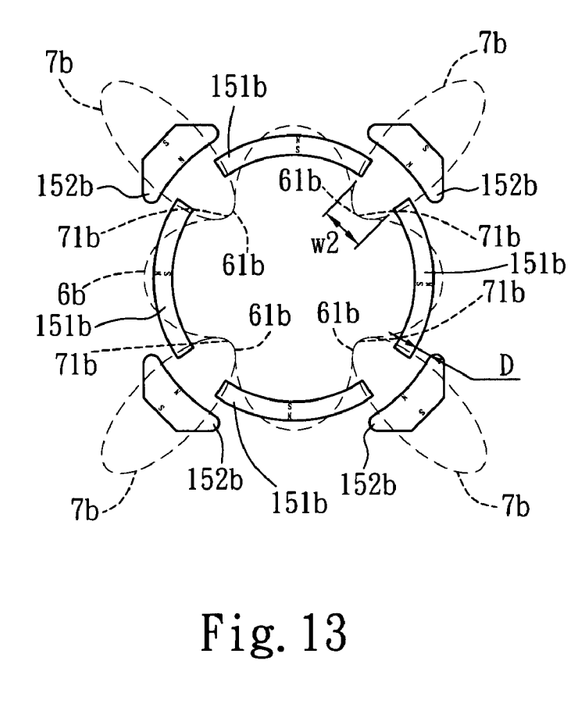
FIG. 13 is a schematic view of magnetic force of the miniature magnetic-levitated lens driving device in a third preferred embodiment according to the present invention.

Referring to FIG. 13, there is shown a schematic view of magnetic force of the miniature magnetic-levitated lens driving device in a third preferred embodiment according to the present invention. As shown in the drawing, regarding the miniature magnetic-levitated lens driving device 1, the third preferred embodiment differs from the second preferred embodiment in that a preset distance w2 between two adjacent ones of movable magnets 151b in the third preferred embodiment is greater than the preset distance w1 in the second preferred embodiment, that is, w2>w1. Undoubtedly, an increase in the preset distance w2 between two adjacent ones of the movable magnets 151b results in a reduction of the magnetic force at the two adjacent ends of the movable magnets 151b, an increase in the depth of the magnetic force pits 61b of the first magnetic force 6b arising from the movable magnets 151b, a reduction of the magnetic repulsive force for repulsing the permanent magnets 152b, and thus an increase in the depth the magnetic force peaks 71b (i.e., the strongest point of magnetic force) of the permanent magnets 152b are inserted into the magnetic force pits 61b (i.e., the weakest point of magnetic force), respectively. Hence, regarding the miniature magnetic-levitated lens driving device of the present invention, the third preferred embodiment excels the second preferred embodiment in resistance of the lens module 13 to rotation.

In other words, an increase in the preset distance w2 between two adjacent ones of the movable magnets 151b results in a reduction of magnetic force between the two adjacent ones of the movable magnets 151b and an increase in the depth the magnetic force peaks 71b of the second magnetic force 7b produced by the permanent magnets 152b are inserted into the magnetic force pits 61b of the first magnetic force 6b, respectively, by electromagnetic field characteristics; hence, the lens carrier 132 coupled to the movable magnets 151b is firmly fixed to the receiving space 122 of the casing 12 and prevented from rotation.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A miniature magnetic-levitated lens driving device, defined with a central axis and comprising:
a casing having a hollow structure and formed therein with a receiving space;
a lens module received in the receiving space and movable along the central axis within the casing; and
a magnetic-levitated module provided in the receiving space and corresponding in position to the lens module, wherein the magnetic-levitated module further comprises: at least a first magnet, a plurality of second magnets, and a coil fixed to a periphery of the receiving space and an inner wall of the casing and disposed between said at least a first magnet and the plurality of second magnets; both the first magnet and the plurality of second magnets being magnets having two polarities; surfaces of the second magnets facing the first magnet at corresponding areas being presented to have the same polarity with the corresponding areas of the first magnet; the first magnet being coupled to the lens module and the plurality of second magnets corresponding in position to the first magnet so as for a magnetic repulsive force to be produced between the first magnet and the plurality of second magnets for magnetically suspending the lens module in the receiving space.

2. The miniature magnetic-levitated lens driving device of claim 1, wherein the lens module further comprises a lens and a lens carrier, the lens being centrally disposed in the lens carrier and movable together with the lens carrier synchronously.

3. The miniature magnetic-levitated lens driving device of claim 1, wherein the first magnet comprises a plurality of ring-shaped movable magnets coupled to the lens module, and the second magnets are magnets peripherally provided on the inner wall of the casing and corresponding in position to the ring-shaped movable magnets while the coil is a circular coil disposed in a gap between the movable magnets and the second magnets.

4. The miniature magnetic-levitated lens driving device of claim 3, wherein an axial center of the second magnets is offset from an axial center of the movable magnets by a preset distance in a backward direction.

5. The miniature magnetic-levitated lens driving device of claim 3, wherein the second magnets are arranged into a quadruplet, equidistantly spaced apart, provided on a periphery of the receiving space and the inner wall of the casing, and configured to work in conjunction with the movable magnets corresponding in position to the second magnets to produce repulsion therebetween.

6. The miniature magnetic-levitated lens driving device of claim 3, wherein a gap between two adjacent said movable magnets has a preset length and is substantively aimed at a center of a corresponding second magnet provided in the receiving space.

7. The miniature magnetic-levitated lens driving device of claim 1, further comprising a lid and a plate spring fixed between the lid and the casing and configured to resiliently confine the lens module to the receiving space.

8. A miniature magnetic-levitated lens driving device, defined with a central axis and comprising:
- a lid having a hollow structure;
- a casing having a hollow structure, coupled to the lid, and formed therein with a receiving space;
- a lens module provided in the receiving space;
- a plate spring fixed between the lid and the casing and configured to resiliently confine the lens module to the receiving space and move along the central axis;
- at least a movable magnet provided outside the lens module peripherally;
- a plurality of permanent magnets fixed to a periphery of the receiving space and the inner wall of the casing and corresponding in position to the movable magnet; and
- a circular coil fixed to the periphery of the receiving space and an inner wall of the casing and disposed between the movable magnet and the permanent magnets;
- wherein the permanent magnets and the movable magnet have two facing surfaces of a same polarity.

9. The miniature magnetic-levitated lens driving device of claim 8, wherein the lens module further comprises a lens and a lens carrier, the lens being centrally disposed in the lens carrier and movable together with the lens carrier synchronously.

10. The miniature magnetic-levitated lens driving device of claim 8, wherein an axial center of the permanent magnets is offset from an axial center of the movable magnet by a preset distance in a backward direction.

11. The miniature magnetic-levitated lens driving device of claim 8, wherein the permanent magnets are arranged into a quadruplet, equidistantly spaced apart, provided on a periphery of the receiving space and the inner wall of the casing, and configured to work in conjunction with the movable magnet corresponding in position to the permanent magnets to produce repulsion therebetween.

12. The miniature magnetic-levitated lens driving device of claim 8, further comprising a lid and a plate spring fixed between the lid and the casing and configured to resiliently confine the lens module to the receiving space.

* * * * *